June 23, 1925.

P. H. CHASE

ELECTRIC DISTRIBUTION SYSTEM

Filed July 1, 1924     4 Sheets-Sheet 1

1,543,370

June 23, 1925.  
P. H. CHASE  
ELECTRIC DISTRIBUTION SYSTEM  
Filed July 1, 1924  
1,543,370  
4 Sheets-Sheet 2

Philip H. Chase,  
Inventor,  
Delos G. Haynes,  
Attorney

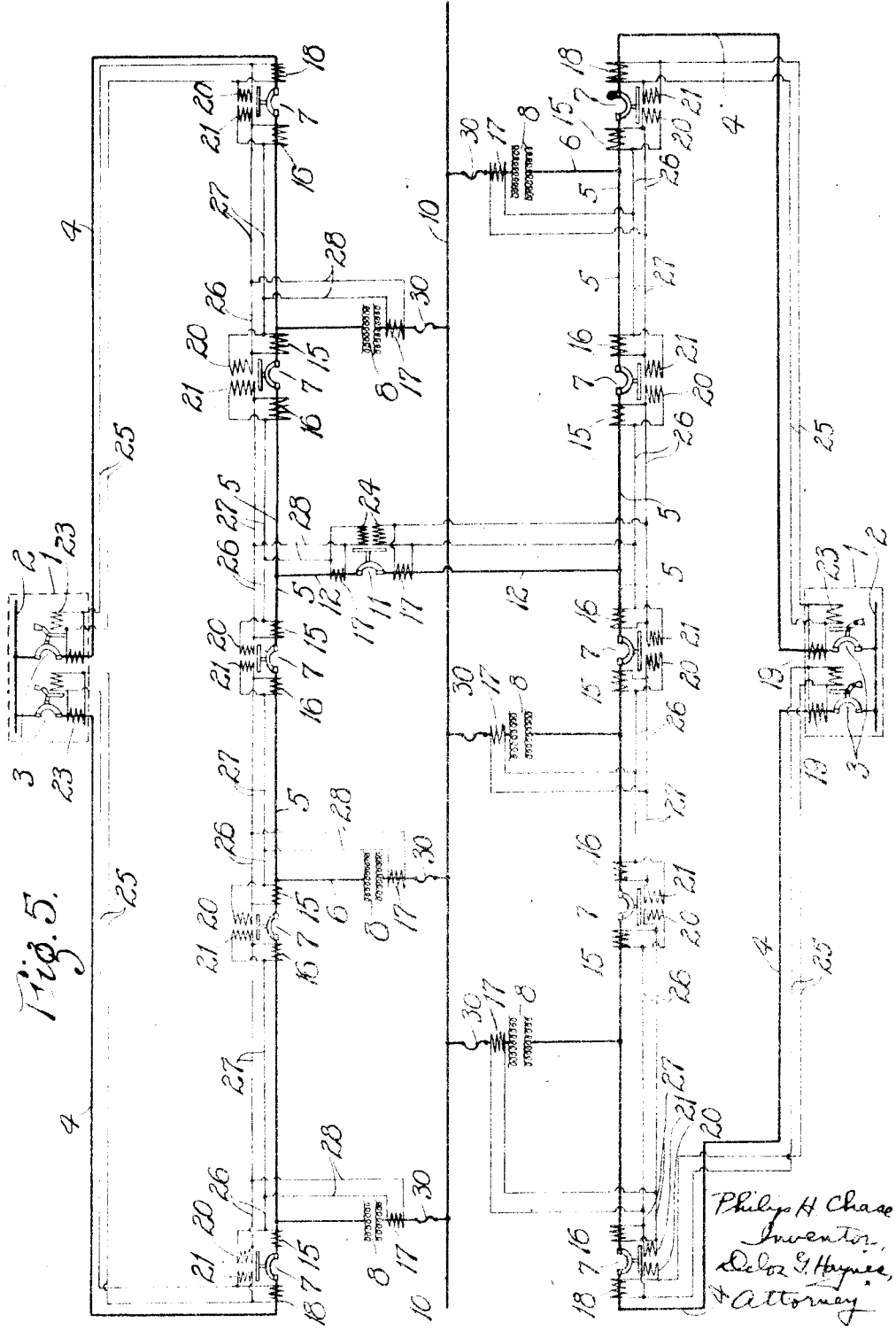

Patented June 23, 1925.

1,543,370

UNITED STATES PATENT OFFICE.

PHILIP H. CHASE, OF BALA, PENNSYLVANIA.

ELECTRIC DISTRIBUTION SYSTEM.

Application filed July 1, 1924. Serial No. 723,516.

*To all whom it may concern:*

Be it known that I, PHILIP H. CHASE, a citizen of the United States, and a resident of Bala, Montgomery County, Pennsylvania, have invented an Improvement in Electric Distribution Systems, of which the following is a specification.

This invention relates to electric distribution systems, and with regard to more specific features, to circuit and control arrangements and connections.

Among the several objects of the invention may be noted the provision of simple and effective means for isolating sections of an electric power distribution system and thereby minimizing interruptions due to a failure of equipment, feeders or mains; the attainment of a high degree of reliability of service with a comparatively small number of circuit-interrupting devices; the reduction of mileage in electric power distribution system primary feeders and mains supplying a primary or secondary system of mains; and the provision of simple, rugged and highly selective means of protection to an electric distribution system of minimum expense, adapted to withstand severe service conditions. Other objects will be in part obvious and in part pointed out hereinafter.

The invention accordingly comprises the features of construction, combinations of elements and arrangements of parts, which are exemplified in the description hereinafter in connection with the accompanying drawings, and the scope of the application of which will be indicated in the following claims.

In the accompanying drawings, in which is shown one of various embodiments of this invention, Fig. 1 is a one-line schematic diagram of a preferred embodiment of the invention;

Fig. 5 is a one-line schematic diagram of other embodiments of the invention, illustrating more than one feeder, and tie connections between feeders.

Figure 1:
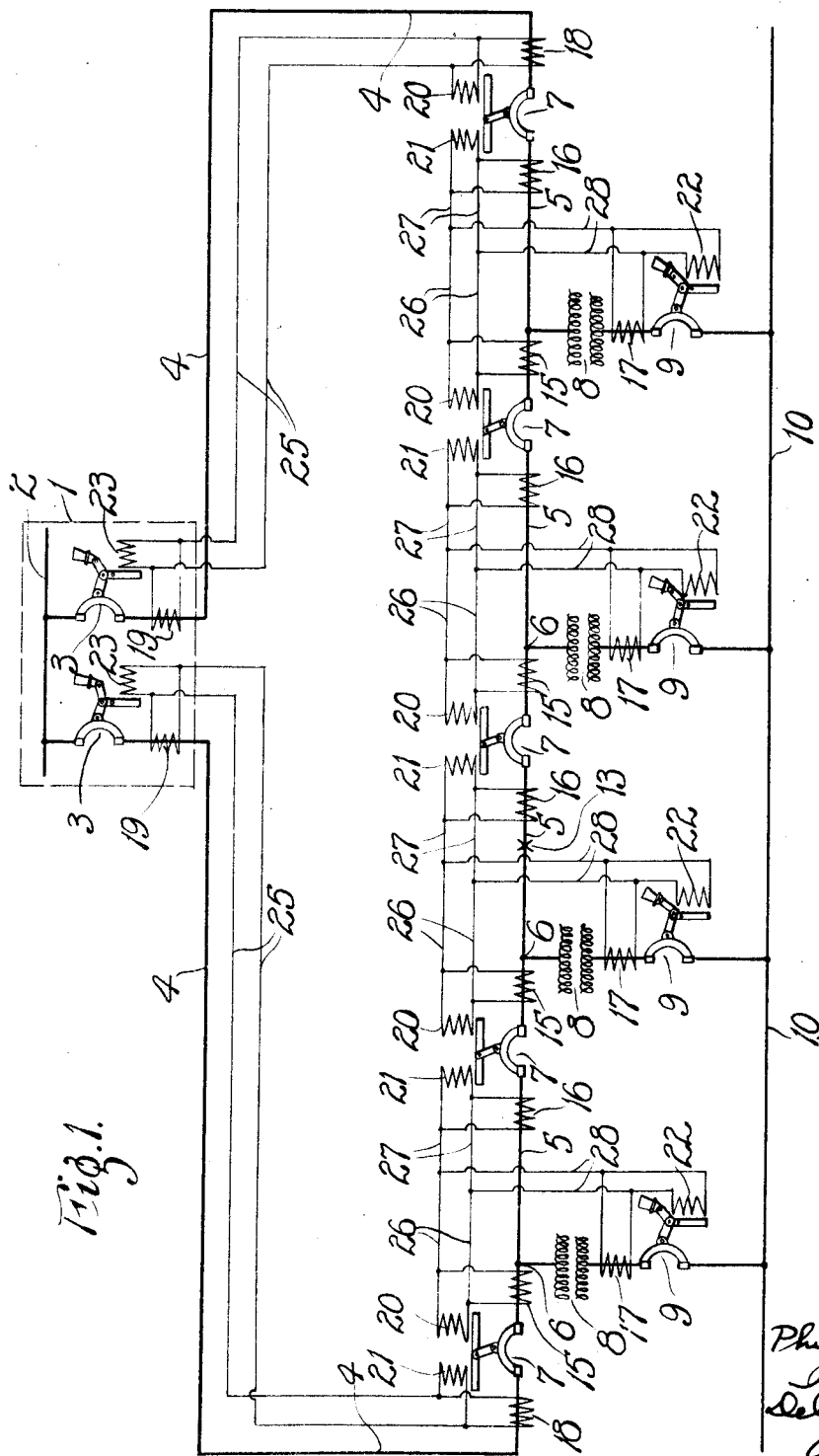
Figure 2:
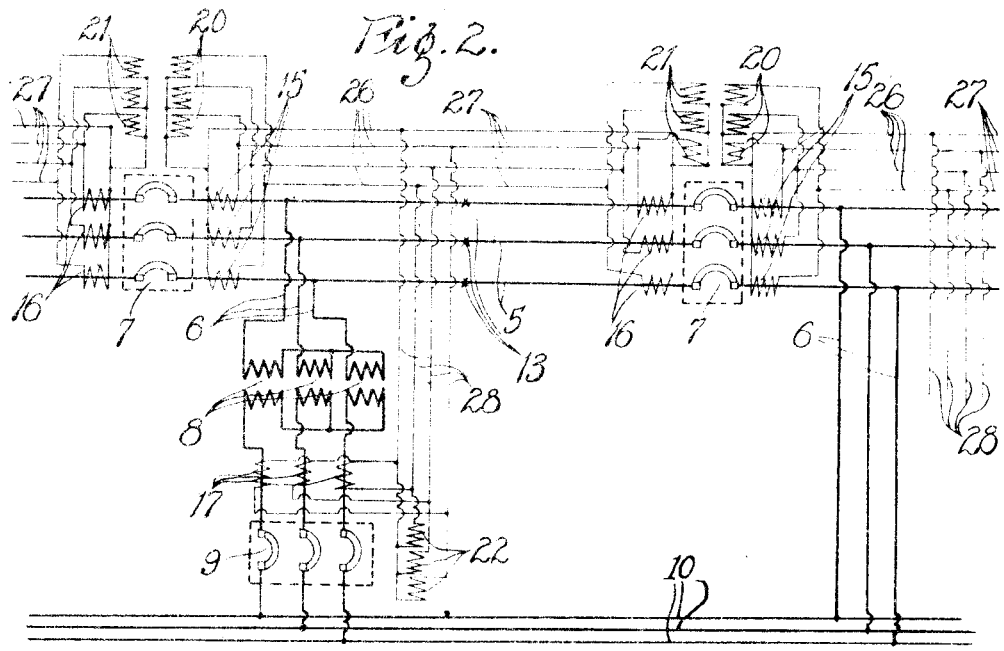
Fig. 2 is a full-line schematic diagram of a feeder section of Figure 1, for a three-phase circuit.

Referring now more particularly to Figs. 1 and 2 of the accompanying drawings, there is illustrated at 1 a sub-station supplying an electric distribution system, through sub-station circuit-breakers 3, feeders 4, and feeder sections 5. The feeder sections 5 are connected in series with each other and the feeders 4 by means of section circuit-breakers 7, thus together forming a loop feeder with supply from the sub-station at both ends under normal conditions.

Each feeder section 5 has a tap 6 supplying a transformer or transformer bank 8, the secondary side of which supplies a load, loads or secondary mains 10, through a circuit-interrupting device 9. The secondary mains 10 supplied from each transformer or transformer bank 8, are preferably connected together or may be operated separately, depending upon service requirements, cost and operating features.

The feeders, feeder sections, and mains may be in cable or may be open wire, the circuit-interrupting devices may be oil-break or air-break type of circuit breakers, or other suitable circuit-interrupting device, for aerial, subway or building installation, and the transformers may be either aerial, subway or indoor type. The feeder and secondary voltages, the number of phases and the frequency may be any that are suitable for the service and installation requirements.

Each section circuit-breaker 7, is equipped with two sets of trip coils 20 and 21, each set actuated separately by the currents in the pilot wire control circuits 26, 27, 28, from the current transformers 15, 16, 17, connected respectively thereto. Each secondary transformer circuit-breaker 9, is equipped with one set of trip coils 22, connected to and actuated by the same pilot wire control circuits and current transformers. The circuit-breakers may be equipped for manual or electrical closing, and if equipped for electrical closing, the trip coils 20, 21 or 22, may be replaced by relays (not shown)

which in turn energize a single trip coil on each circuit-breaker from a control source. The current transformers are preferably located within or immediately adjacent to their respective circuit-breakers. The pilot wires may be in cable, or open wire, or may be incorporated under the same sheath with the main conductor if they are in cable.

The current transformers 15 and 16, at the two ends of the feeder section 5, have the same ratio and should preferably be identical, and through the pilot wires 26 and 27 they are connected in such a way that under normal conditions the potentials are the same in direction and magnitude. The current transformers 17, on the secondary side of the transformers are of such a ratio that the current in the secondary winding of the current transformers 17 is substantially the same per ampere in the primary taps 6 to the transformers 8, as is the current in current transformers 15 and 16 per ampere of current passing through their primaries. The current transformers 17 are connected by pilot wires 28 to the pilot wires 27 which are connected to the current transformers 15 and 16 in respective phases. It is apparent that in the system of current transformers 15, 16, 17 and pilot wires 26, 27 and 28, there is a condition of similitude in the magnitude and direction of the currents in all parts to the currents in corresponding parts of the main feeder section 5 and the tap 6.

The pilot system balances, in its component parts, for the normal condition in the corresponding main circuit: that is, the total current output is equal in magnitude and direction to the total current input, giving a resultant substantially zero. The actual deviation from a condition of exact balance is usually relatively small and results from factors, such as losses in the feeder section and transformers, and in transformers and current-transformer ratios.

Under normal conditions, therefore, there is substantially a condition of current balance in the pilot wire system regardless of the magnitude and direction of flow of power between other feeder sections and the feeder section under consideration and regardless of the magnitude and direction of flow of power through the circuit breaker 9. As a result there is a very low voltage across the terminals of the various current transformers 15, 16 and 17 and accordingly the magnitude of the current through the relatively high impedance trip coils as negligible and insufficient to actuate them.

If however there is a fault or breakdown in the feeder section 5 such as at the point 13, there will be a disturbance of the normal balance of the pilot system connected thereto and either the magnitude or the direction, or both, of the potentials in the current transformers 15, 16 and 17 on the section changes substantially from the normal balance condition. Under fault conditions the magnitude of the unbalance may be very large.

The potential across each current transformer rises and causes the unbalanced components of the currents to pass through the trip coils 15, 16 and 17 connected to the pilot wires on the faulty section, thereby actuating them, opening the two section circuit-breakers 7 and the circuit-breaker 9, and isolating the faulty feeder section and the transformer bank.

The fault may involve one or more phase wires and result in unbalance only on the corresponding phase or phases of the pilot circuit and still actuate the corresponding trip coils.

Under such fault conditions the normal balance in the other feeder sections has not been substantially disturbed, and no feeder section breakers 7 except those connected to the faulty feeder section have opened, nor has service to loads supplied from the other sections been interrupted. Further, with the transformer banks connected to the same mains 10, the tripping of circuit breaker 9 has cleared the faulty section from the mains but the load normally carried by the transformer bank 8 on the faulty section is picked up by the other banks, without interruption of service to those loads supplied from the mains 10.

It is therefore apparent that any fault or failure occurring on the feeder section 5, on the tap 6, or in the transformer bank 8, or at any point between the current transformers 15, 16 and 17 on a given section, will result in the isolation of that section from the rest of the system.

As each section circuit-breaker is provided with a set of trip coils for each of the pilot wire systems pertaining to the feeder section to either side of it, each section breaker serves to isolate two feeder sections. The number of feeder section breakers is therefore minimized and the cost and complication are materially reduced.

As the operation of the protective equipment on each feeder section is determined by conditions within that section, the feeder may comprise as many sections as is considered desirable.

The feeder 4 (Fig. 1) is illustrated as provided with pilot wires 25 from the sub-station feeder current transformers 19, to the feeder current transformers 18, and trip coils 20 and 21 on the feeder section circuit breakers 7 on feeders 4 and trip coils 23 on the sub-station feeder circuit breakers 3. These feeders are illustrated with no taps to transformers or loads and therefore there is a two-way balance instead of the three-way balance on the pilot wire systems pertaining to the feeder sections. Selective operation of the sub-station feeder breaker 3 and the feeder section breaker 7 on the other end of feeder 4 in the event of a failure or fault on the feeder results in a disturbance of the balance and actuation of the trip coils in a manner similar to that with a feeder section having no tap 6, described below.

The feeders 4 may be provided with excess current relay protection at the substation end and with power directional relays at the ends adjacent to adjoining feeder sections, or there may be other types of relay protection for the feeder and either with or without the pilot wires from the substation to the first section breakers 7. Such methods may be followed without loss of the advantages of the feeder section protection described. There may also be provided on part or all of the feeder section breakers 7 and transformer secondary breakers 9, additional types of relay protection such as excess current and power directional, in order to provide for sectionalizing of feeder sections or groups of feeder sections, for example under extraordinary emergency conditions.

Deviations from exact current balance in the pilot wire system 25, 26, 27 may be kept within desired limits by the use of supplemental current transformers or autotransformers with taps, and loading coils or equivalent devices (not shown). By such means the deviations due to differences in current transformers, transformer ratios, losses in the circuits and other such variables may readily be compensated for.

Figure 3:
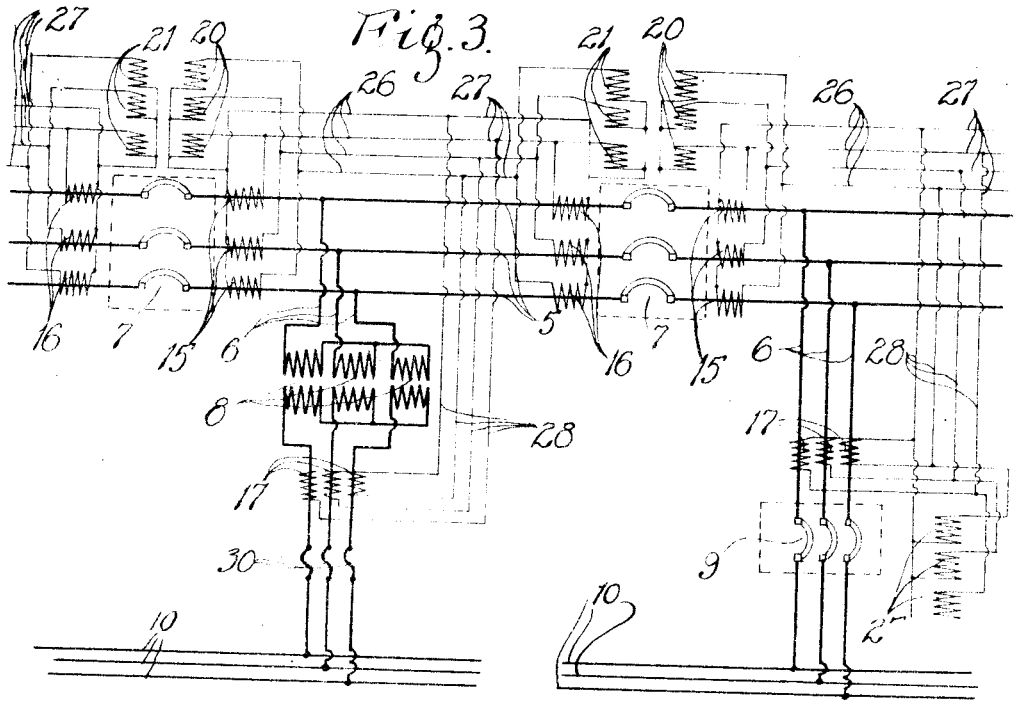
Fig. 3 is a full-line schematic diagram of other preferred embodiments of the invention, substituting fuses for the secondary transformer circuit breakers in Fig. 1 and illustrating the omission of transformers.

In Fig. 3 is illustrated a feeder section and a portion of another feeder section in one of which the secondary transformer fuses 30 are substituted for the transformer secondary circuit-breaker 9, and in the other of which the transformers 8 are omitted. The use of fuses 30 instead of the transformer secondary circuit-breaker 9 will often be preferable when the interrupting duty or the voltage is low. With this arrangement, it is apparent that the only difference in the operation is that the blowing of the fuses is dependent upon the current through them and in no way affects the balance in the pilot wire control circuits nor the operation of the feeder section circuit-breakers 7. The omission of the transformers 8 does not affect the operation of the circuit breakers 7 and 9, but requires current transformers 17 of the same ratio as the current transformers 15 and 16 on the feeder section.

Figure 4:
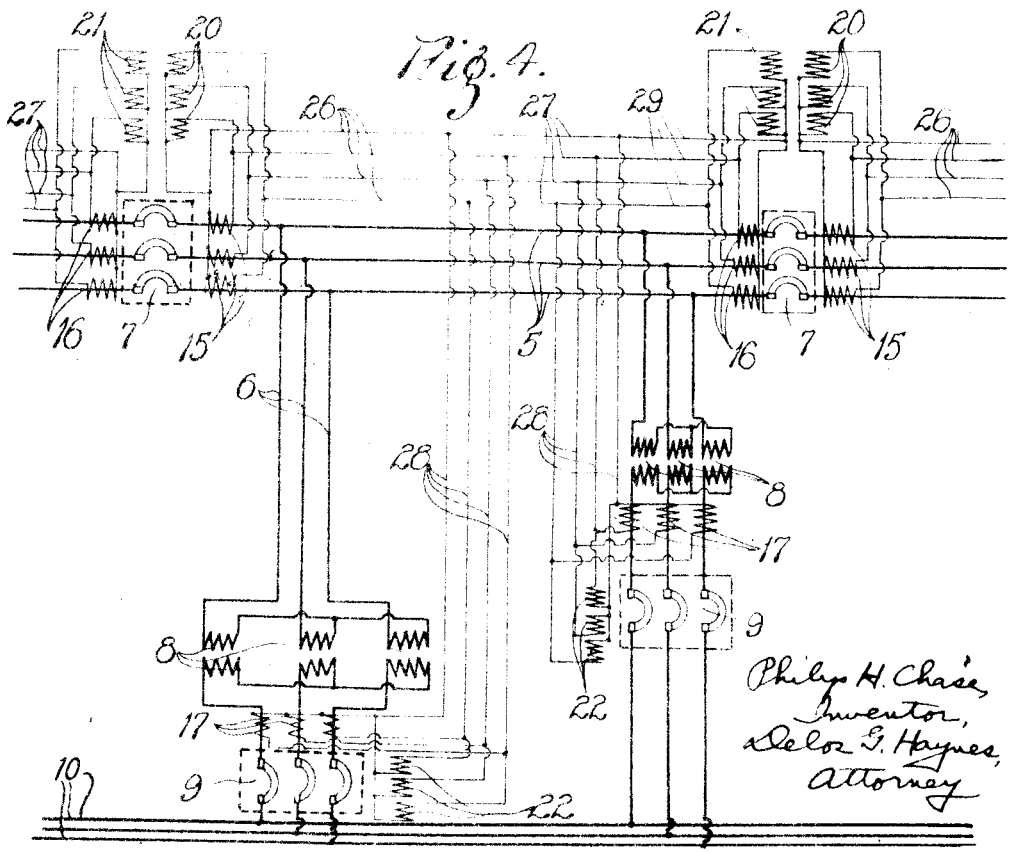
Fig. 4 is a full-line schematic diagram of another embodiment of the invention, illustrating more than one transformer or load tap on a feeder section.

Figure 4 illustrates a feeder section 5 with two taps 6 each supplying a transformer bank 8 protected on the secondary side by a circuit-breaker 9 as in Figures 1 and 2. The pilot wire control system 26, 27, 28, 29 provides a substantial balance equivalent to that in the corresponding portions of the main circuit. It is apparent that a number of load taps may be made to a feeder section, with corresponding pilot wire and current transformer equipment, and still secure the same operative features as described in connection with Figures 1, 2 and 3.

Figure 5 illustrates two loop feeders similar to those shown in the preceding figures, each comprising feeders 4, feeder sections 5, taps 6, transformers 8 and secondary fuses 30. The two feeders are illustrated supplying a secondary main system or network 10, which as in the preceding figures is connected to translating devices (not shown). In the event of a failure on any feeder section, the section circuit-breakers 7 on that section are actuated by the unbalance in current in the trip coils 20 and 21, and the fuses 30 on the transformer on that section blow due to the short-circuit current through them from the mains 10, supplied from the other transformers connected to the same mains, hereinbefore described.

Figure 5 also illustrates a tie-circuit breaker 11, which connects between two feeder sections 5 of different feeders by taps 12. The pilot wire control system 26, 27, 28, with the current transformers 15, 16, 17. and trip coils 20, 21 and 24, actuate the three breakers 7, 9 and 11 on whichever of the two connecting sections 5, 12, that a fault occurs, similarly to the connections above described.

By the methods and apparatus shown in Figures 1 to 5 inclusive, in various combinations, distribution feeder networks, both primary and secondary, may be built up to afford such connections as may be desired, with great flexibility and selectivity.

Figure 6:
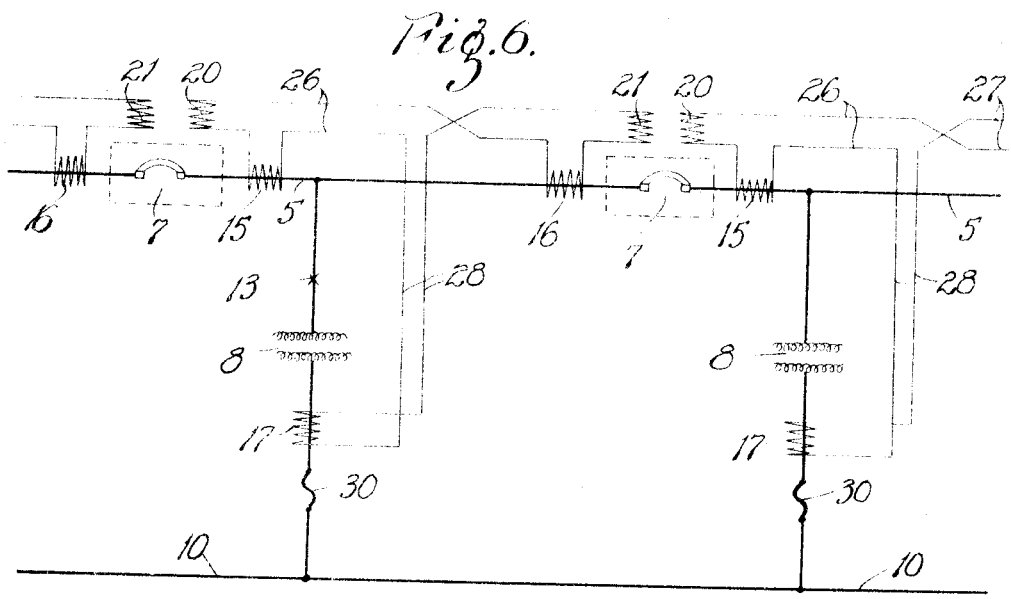
Fig. 6 is a one-line schematic diagram of a feeder section, illustrating the use of potential balance.

Figure 6 illustrates another balance method applied to a typical feeder section. In this connection, the current transformers 15, 16 and 17 are connected in series with each other and with the trip coils 15 and 16 on the section circuit-breakers so that under normal conditions the sum of the potentials around the control circuit is substantially zero under normal conditions, and therefore there is negligible current passing through the trip coils 20 and 21. If, however, there is a fault 13, the potential balance is disturbed and current passes through the trip coils, thus actuating the circuit breakers. This method requires different type current transformers and higher insulation on the control circuits and trip coils than is the case with the current balance illustrated in Figs. 1 to 5 inclusive.

In view of the above it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. An electric distribution system comprising a sectionalized power loop; a tap connecting a loop section to another circuit; circuit-interrupting devices associated with said loop section and tap for isolating said section from the loop; and isolating means for operating said circuit interrupting devices; said isolating means comprising a transformer adjacent either end of the loop section, a transformer in the tap, a pilot circuit in which the secondaries of the transformers are connected, and trip devices energized from the pilot circuit and adapted to open the circuit-interrupting devices at either end of the loop section.

2. An electric distribution system comprising a sectionalized power loop adapted to be energized from one or more sources of power; a load; a tap connecting a loop section to the load; circuit-interrupting devices associated with said loop section and tap for isolating said section from the loop and from the load; and isolating means for operating said circuit-interrupting devices; said isolating means comprising a transformer adjacent either end of the loop section, a transformer in the tap, a pilot circuit in which the secondaries of the transformers are connected, and trip devices energized from the pilot circuit and adapted to open the circuit-interrupting devices at either end of the loop section and in the tap.

3. An electric distribution system comprising a sectionalized power loop adapted to be energized from one or more sources of power; a load; a tap connecting a loop section to the load; means for opening the tap; circuit-interrupting devices associated with said loop section for isolating said section from the loop; and isolating means for operating said circuit-interrupting devices; said isolating means comprising a transformer adjacent either end of the loop section, a transformer in the tap, a pilot circuit in which the secondaries of the transformers are connected, and trip devices energized from the pilot circuit and adapted to open the circuit-interrupting devices at either end of the loop section.

4. An electric distribution system comprising a sectionalized power loop; a tap connecting a section of said loop to another circuit; means for opening the tap-circuit-interrupting devices associated with said loop section for isolating said section from the loop and from said circuit; and isolating means for operating said circuit-interrupting devices; said isolating means comprising a transformer adjacent either end of the loop section, a transformer in the tap, a pilot circuit in which the secondaries of the transformers are connected, and trip devices energized from the pilot circuit and adapted to open the circuit-interrupting devices at either end of the loop section.

5. An electric distribution system comprising a plurality of sectionalized power loops; a load; taps connecting a section of each loop to the load; circuit-interrupting devices associated with said taps for isolating the respective tap from the load; and isolating means for operating said last-named circuit-interrupting devices; each said isolating means comprising a transformer adjacent either end of the respective loop section, a transformer in said tap, a pilot circuit in which the secondaries of the transformers are connected, and trip devices energized from the pilot circuit and adapted to open the circuit-interrupting devices at either end of the loop section and in the tap.

6. An electric distribution system comprising a plurality of sectionalized power loops each adapted to be energized from one or more sources of power; mains; a tap; a feeder connecting a loop section to the mains; means for opening the tap; circuit-interrupting devices associated with said loop section for isolating said section from the loop; isolating means for operating said circuit-interrupting devices; a tap connecting a section of one loop to a section of another loop; circuit-breaking means in the latter tap; circuit-interrupting devices associated with said last-named sections for isolating the respective section from its loop; and isolating means for operating said last-named circuit-interrupting devices and said last-named circuit breaking means; said isolating means comprising a transformer adjacent either end of the respective loop section, a transformer in said latter tap, a pilot circuit in which the secondaries of the transformers are connected, and trip devices energized from the pilot circuit and adapted to open the circuit-interrupting devices at either end of the loop section and in the latter tap.

7. An electric distribution system comprising a plurality of sectionalized power loops each adapted to be energized from one or more sources of power; mains; a tap connecting a loop section to the mains; means for opening the tap; circuit-interrupting devices associated with said loop section for isolating said section from the loop; isolating means for operating said circuit-interrupting devices; said isolating means comprising a transformer adjacent either end of the loop section, a transformer in the tap, a pilot circuit in which the secondaries of the transformers are connected, and trip devices energized from the pilot circuit and adapted to open the circuit-interrupting devices at either end of the loop section; a tap connecting a section of one loop to a section of another loop; circuit-breaking means in said tap; circuit-interrupting devices associated with said last-named sections for isolating the respective sections from its loop; and isolating means for operating said last-named circuit-interrupting devices and said last-named circuit-breaking means; said isolating means comprising a transformer adjacent either end of the respective loop section, a transformer in said tap, a pilot circuit in which the secondaries of the transformers are connected, and trip devices energized from the pilot circuit and adapted to open the circuit-interrupting devices at either end of the loop section and in the tap.

8. An electric distribution system comprising a sectionalized power loop; a plurality of taps adapted to connect a loop section to translating devices; circuit-interrupting devices associated with said loop section for isolating said section from the loop; and isolating means for operating said circuit-interrupting devices; said isolating means comprising a transformer adjacent either end of the loop section, a transformer in each tap, a pilot circuit in which the secondaries of the transformers are connected, and trip devices energized from the pilot circuit and adapted to open the circuit-interrupting devices at either end of the loop section.

9. An electric distribution system comprising a sectionalized power loop adapted to be energized from one or more sources of power; a plurality of taps adapted to connect a loop section to translating devices; circuit-interrupting devices associated with said loop section and taps for isolating said section from the loop and from said translating devices; and isolating means for operating said circuit-interrupting devices; said isolating means comprising a transformer adjacent either end of the loop section, a transformer in each tap, a pilot circuit in which the secondaries of the transformers are connected, and trip devices energized from the pilot circuit and adapted to open the circuit-interrupting devices at either end of the loop section and in the taps from said section.

10. An electric distribution system comprising circuit-interrupting devices, a feeder section adapted to be connected through said circuit-interrupting devices to a plurality of sources of power and to a load; and a balance protective system associated with each power-supply-circuit-interrupting device and with the load terminus of the section, and adapted upon an unbalance in the protective system to isolate the feeder section from its sources of power.

11. An electric distribution system comprising circuit-interrupting devices, a feeder section adapted to be connected through circuit-interrupting devices to a plurality of power sources and to taps to power-utilizing devices; and a balance protective system associated with each power-supply-circuit-interrupting device and tap and adapted upon an unbalance in the protective system to isolate the feeder section from its sources of power and from said power-utilizing devices.

12. An electric distribution system comprising a sectionalized power loop adapted to be energized from one or more sources of power; mains; a tap connecting a loop section to the mains; means for opening the tap; circuit-interrupting devices associated with said loop section for isolating said section from the loop; and current-balance-responsive isolating means for operating said interrupting devices; said isolating means comprising a current transformer adjacent either end of the loop section, a current transformer in the tap, a pilot circuit in which the secondaries of the transformers are connected, and trip devices energized from the pilot circuit and adapted to open the circuit-interrupting devices at either end of the loop section upon a predetermined abnormal condition.

13. An electric distribution system comprising a sectionalized power loop adapted to be energized from one or more sources of power; mains; a tap connecting a loop section to the mains; current-interrupting devices associated with said loop section and tap for isolating said section from the loop and from the mains; and current-balance-responsive isolating means for operating said circuit-breakers; said isolating means comprising a current transformer adjacent either end of the loop section, a current transformer in the tap from said section to the mains, a pilot circuit in which the secondaries of the transformers are connected, and trip devices energized from the pilot circuit and adapted to open the circuit-interrupting devices at either end of the loop section and in the tap from said section upon a predetermined abnormal condition.

14. An electric distribution system comprising a sectionalized power loop adapted to be energized from one or more sources of power; mains; a tap connecting a loop section to the mains; means for opening the tap; circuit-interrupting devices associated with said loop section for isolating said section from the loop; and potential-balance-responsive isolating means for operating said circuit-breakers; said isolating means comprising a potential transformer adjacent either end of the loop section, a transformer in the tap from said section to the mains, a pilot circuit in which the secondaries of the transformers are connected, and trip devices energized from the pilot circuit and adapted to open the circuit-interrupting devices at either end of the loop section upon a predetermined abnormal condition.

15. An electric distribution system comprising a sectionalized power loop adapted to be energized from one or more sources of power; mains; a tap connecting a loop section to the mains; circuit-interrupting devices associated with said loop section and feeder for isolating said section from the loop and from the mains; and potential-balance-responsive isolating means for operating said circuit-interrupting devices; said isolating means comprising a transformer adjacent either end of the loop section, a transformer in the tap from said section to the mains, a pilot circuit in which the secondaries of the transformers are connected, and trip devices energized from the pilot circuit and adapted to open the circuit-interrupting devices at either end of the loop section and in the tap from said section upon a predetermined normal condition.

16. An electric distribution system comprising circuit-interrupting devices, a feeder section adapted to be connected through said circuit-interrupting devices to a plurality of sources of power and to a tap to a load; and a balance protective system associated with each power-supply-circuit-interrupting device and with the tap, and adapted upon an unbalance in the protective system to isolate the feeder section from its sources of power and from the load.

17. An electric distribution system comprising a feeder, a circuit-interrupting device therein, a balance protective system associated with the feeder section on either side of the device, each protective system being adapted to operate the device upon an unbalance in that system.

18. An electric distribution system comprising a feeder, a circuit interrupting device therein, a balance protective system associated with the feeder section on either side of the device; each protective system comprising transformers in the feeder adjacent the circuit-interrupting device, transformers in the feeder adjacent the other ends of said feeder sections, a pilot circuit connecting the secondaries of the former transformers with the secondaries of the latter transformers, and means operated by said pilot circuits for actuating said circuit-interrupting device; each protective system being adapted to operate the device upon an unbalance in that system.

In testimony whereof, I have signed my name to this specification this 30th day of June, 1924.

PHILIP H. CHASE.